(12) United States Patent
Maynard et al.

(10) Patent No.: US 7,450,134 B2
(45) Date of Patent: Nov. 11, 2008

(54) METHODS AND APPARATUS FOR ENCODING AND DECODING IMAGES

(75) Inventors: Stephen L. Maynard, Arvada, CO (US); John Callahan, Broomfield, CO (US); Ben Payne, Westminster, CO (US)

(73) Assignee: Time Warner Cable Inc., Stamford, CT (US)

( * ) Notice: Subject to any disclaimer, the term of this patent is extended or adjusted under 35 U.S.C. 154(b) by 0 days.

(21) Appl. No.: 10/992,628

(22) Filed: Nov. 18, 2004

(65) Prior Publication Data

US 2006/0103660 A1 May 18, 2006

(51) Int. Cl.
*G06T 9/00* (2006.01)
*G09G 5/02* (2006.01)
*H04N 7/26* (2006.01)

(52) U.S. Cl. .............. 345/589; 345/600; 345/606; 345/547; 345/549; 348/393.1; 348/557; 348/568; 382/166; 382/232; 382/233; 375/240.25

(58) Field of Classification Search ............. 345/581, 345/589, 592, 593, 600–606, 597, 547, 549, 345/555; 348/386, 391, 393, 557, 560, 562, 348/567–568, 395.1, 403.1; 382/162, 166, 382/167, 232, 233; 375/240.25
See application file for complete search history.

(56) References Cited

U.S. PATENT DOCUMENTS

| | | | | |
|---|---|---|---|---|
| 5,351,133 | A * | 9/1994 | Blonstein | 358/426.05 |
| 5,710,719 | A * | 1/1998 | Houle | 382/232 |
| 5,867,112 | A * | 2/1999 | Kost | 341/51 |
| 6,748,520 | B1 | 6/2004 | Maynard et al. | |
| 2001/0033286 | A1 * | 10/2001 | Stokes et al. | 345/590 |
| 2003/0007695 | A1 * | 1/2003 | Bossut et al. | 382/239 |
| 2004/0010565 | A1 * | 1/2004 | Hong et al. | 709/217 |

OTHER PUBLICATIONS

Deutsch, Peter, "RFC 1052 (RFC1952)", downloaded on Sep. 23, 2004, from http://www.faqs.org/rfcs/rfc1952.html, 11 pgs., Aladdin Enterprises, May 1996.

Roelofs, Greg, "A Basic Introduction to PNG Features", downloaded on Sep. 23, 2004, from: http://www.libpng.org/pub/png/pngintro/html, 7 pgs., last modified Aug. 10, 2004.

(Continued)

*Primary Examiner*—Wesner Sajous
(74) *Attorney, Agent, or Firm*—Straub & Pokotylo; Michael P. Straub (57) ABSTRACT

Methods and apparatus for generating images, compressing image data, decompressing image data, and processing the decompressed image data so that it can be used by a rendering circuit of a device, e.g., a set top box, are described. Images are generated in the native format used by the rendering circuit of the device which will ultimately control the display of the image avoiding the need to perform processing associated with converting color component information from one format to another. Uncompressed image data is arranged in a file with color component values being grouped separately from alpha values to facilitate compression by a standard file compression technique. The file is compressed using a conventional file compression operation. The compressed image file is decompressed when needed and the alpha data and color component data is reorganized so that the color component values and alpha value(s) corresponding to individual pixels are grouped together.

32 Claims, 8 Drawing Sheets

OTHER PUBLICATIONS

"PNG (Portable Network Graphics)", downloaded on Sep. 23, 2004, from http://www.w3org.Graphics/PNG/, 2 pgs., created Feb. 14, 1995, last updated May 17, 2004.

"Portable Network Graphics (PNG) Specification (Second Edition) Information technology—Computer graphics and image processing—Portable Network Graphics (PNG): Finctinal specification. ISO/IEC 15948:2003 (E)", downloaded on Sep. 23, 2004, http://www.w3org.TR/PNG, 27 pgs., 2003.

* cited by examiner

METHODS AND APPARATUS FOR ENCODING AND DECODING IMAGES

FIELD OF THE INVENTION

The present invention relates to image processing and, more particular, to methods for generating, compressing, decompressing and/or preparing images for subsequent processing and display that are well suited for a variety of applications including, e.g., set top box applications.

BACKGROUND OF THE INVENTION

The representation of images using digital data has become commonplace. Recent improvements in transmission systems and storage devices have made the use of digital images practical in a wide variety of applications including, for example, cable television.

The amount of bandwidth available for the delivery of data, e.g., digital images, to customer premises, has increased over time as transmission technology has improved. In addition, the cost for memory and other types of storage which can be used to store digital data has steadily decreased over time. This has resulted in consumer devices with ever increasing amounts of memory.

Even with recent improvements in transmission and data storage, the relatively large size of digital images and the cost advantages of storing or transmitting digital images continues to encourage the use of data compression prior to the transmission of images and/or the storage of digital images.

A fair amount of effort has been put into developing image formats and corresponding compression algorithms which are optimized to achieve good data compression for a wide range of image and/or streaming video applications. Various image encoding schemes, also sometimes called compression methods, have developed to a point which image data may be encoded and decoded in multiple passes, with a portion of the image data being encoded or decoded in each pass. Systems which allow for partial decoding of an image can be desirable in streaming applications where a user may wish to see a low resolution image or a portion of an image before downloading the data corresponding to the full high quality image. Unfortunately, while such encoding algorithms work well for many applications, the complexity of such encoding methods can be a disadvantage in applications where there is limited processing power available or it would be desirable to limit the amount of processing power used, e.g., for cost reasons.

Various data formats and compression algorithms have been developed specifically for the purpose of representing images in a digital format and/or for compressing digital image data. Examples of image data formats and compression algorithms can be found in the JPEG standard, the MPEG standard, and other standards which are known from the commonly used acronyms PNG, BMP and IMG. These compression algorithms often require knowledge of the image location to which particular pixel values correspond with values corresponding to different image locations being grouped and/or processed differently from a compression perspective.

One particular application where digital images are used involves devices which include an embedded application, e.g., a user interface application, which uses images. A Set Top Box (STB) is an example of a device which normally includes an embedded user interface application. STBs are commonly used in cable television applications. Satellite receivers which are coupled to televisions or other display devices are another example of what may be called a Set Top Box.

STBs normally include a dedicated rendering circuit, sometimes called a rendering engine, which performs the processing required to prepare an image represented as a set of pixel values for display on a display device, e.g., the display of a TV set or computer monitor. Rendering circuits normally do not perform data decompression operations or image format conversions. Thus, rendering circuits usually expect the image input data to be in a specific format, e.g., RGB format with or without alpha values, for which the rendering circuit was designed. The rendering circuit is normally designed to work with a specific image input format, e.g., a format used for the pixel values that are the data which represents an image to be displayed. The specific input image data format with which the rendering circuit of an STB is designed to work is the native format of the rendering circuit. The native format of the rendering circuit is often called the native image format of the STB. Since the native image format is determined prior to manufacture of the STB, the native image format is a predetermined format with regard to a given rendering circuit and thus set top box which includes the rendering circuit.

While the rendering circuit requires that data be received by the rendering circuit in a particular format, e.g., the STB's native image format, the rendering circuit will proceed to perform specific image processing operations associated with generating control values which are used to control a particular display device to which the rendering circuit is coupled. Thus, a rendering circuit may generate different control values for a CRT display than it would for an LCD display, e.g., because each of the different types of displays have different light output characteristics.

In the case of STBs, a general purpose CPU in the STB is often responsible for generating menus from stored image data and for outputting other images which may be loaded into the STB memory such as company logos, error information, etc. This functionality is commonly part of a user interface which may be implemented as a routine that is executed by the general purpose processor within the STB.

Images used by a user interface are usually relatively small, e.g., each image may be intended to occupy only a portion of a screen as opposed to the full display screen.

In at least one existing system, images intended for a user interface of a STB are first generated in an image format which uses the same number of bits for each of the Red, Green and Blue color components associated with a pixel, e.g., the image is generated in the RGB 888 format. The generated image is then processed and compressed using a known image standard such as PNG which processes all of the original image bits plus 1 to 8 bits of alpha blending data when present. PNG processing involves subjecting the image data to a complicated series of processing rules along with a well known image compression scheme intended to arrive at an optimized image which can be decoded and displayed in multiple passes. Existing formats such as PNG are widely used because of their relatively small output, ability to display an image prior to full decoding of the image, e.g., show something sooner rather than later, with the complete image being displayed after multiple decoding passes. Set top boxes do not require the ability to display an image in multiple passes and therefore the complexity associated with such processing is wasteful in the context of a STB implementation.

In existing systems, the user interface in a STB, generally referred to as a Resident Application ("RA") uses several graphic images of varying shapes and sizes arranged under control of the user interface routine in an arrangement that will be sensible and pleasing to a user when viewed. The images that are used by a STB user interface application are normally created and stored in one of a plurality of well known image formats and then compressed using a video encoding method intended for the particular image format and/or for a wide range of image applications. Accordingly, images used by the user interface of a STB are presently generated and then stored in a well known image compression format such as, e.g., JPEG, PNG, BMP, etc. Since such formats were designed and intended for general image applications they are not necessarily the best format for the STB specific applications and often necessitate the use of specific processor intensive decoding algorithms which produce decoded image formats which are different from the format used by a set top box.

Accordingly, not only is a fair amount of processing required to decode images encoded using many of the well known encoding algorithms, but additional processing is then often required to convert the decoded image into the image format which is used as the input to the STB's image rendering circuit. This often involves altering the number of bits used to represent color data and/or making other pixel value changes before the image can be supplied to the STB's rendering circuitry.

In view of the above discussion, it should be appreciated that improvements in image coding and processing which can reduce STB image processing requirements and/or the amount of data required to represent an image used by a STB, e.g., in providing a user interface, would be desirable.

Image compression and processing techniques that will allow for reductions in processing power required for a general purpose computer in a set top box are particularly desirable because they can allow for less powerful processors to be used which can have the effect of lowering the cost of set top boxes.

SUMMARY OF THE INVENTION

The present invention is directed to methods and apparatus relating to generating and compressing digital images in a manner that is well suited for use with embedded applications where available processor resources may be limited.

In various embodiments, images are pre-processed to the native embedded image format used by the device which is intended to control the display of the image. The uncompressed image data is then arranged to promote efficient compression by a file compression routine. The arranged image data is then compressed in accordance with the invention using, e.g., a general purpose file compression routine.

When the compressed image data file is decompressed, the color component information will be in the native format of the device which performs the file decompression operation. If necessary, the uncompressed image data is rearranged. After any required rearrangement, the image data will be in the proper format for further display processing, e.g., processing by an image rendering circuit. Since the image data is created and compressed in the native format of the end device which will use the image data, a complete step of image processing to convert between image formats which commonly occurs today in many devices, is eliminated. Significantly, for many images, e.g., many small images which may be used as part of a user interface of a set top box, the methods of the present invention result in smaller compressed image file sizes than occur when various specialized image encoding techniques are used. In addition, the methods of the present invention tend to be less processor intensive since, among other things, conversion between different color component image formats need not be performed in the end device using the compressed image.

The methods and apparatus of the present invention are particularly well suited for use in applications where the image format that is used by a rendering circuit of a device which will control the display of the image is fixed and known at the time of encoding. STBs are an example of one application where the methods and apparatus of the present invention may be used.

Depending on the embodiment, when generating image data, alpha values may be generated in addition to color component values. In one exemplary embodiment, an RGB 565 image format is used for color component values. In one such exemplary embodiment, alpha values, when used, are represented using 8 bits. The RGB 565 image format was chosen for the exemplary embodiment since this is the format used by one known image rendering circuit commonly used in STBs. When used by an image rendering circuit, the alpha value or values corresponding to a pixel of an image is normally supplied with the color component values corresponding to the same pixel. Thus, at the point image data is supplied to a rendering circuit pixel color component information and alpha value information is normally interspersed.

Alpha values and color component values of an image may be generated together, prior to file compression, e.g., in the format the values would be supplied to a rendering circuit. In accordance with the invention color component values and alpha values are separated from one another and then stored in a file which can be compressed. A file header is normally added to the file which is to be compressed. The file header, in some embodiments, indicates the image type and/or whether the image data includes alpha values.

Thus, when alpha values are used in accordance with the invention, uncompressed image data is arranged in a file with color component values being grouped separately from alpha values to facilitate efficient data compression by a standard file compression method. The image file is then compressed using a conventional lossless file compression operation such as, e.g., GZIP. During compression, the compression method treats the different types of data in the file to be compressed in the same manner. Thus, unlike specific image encoding algorithms which may compress color component information differently from other types of image information, the file compression method of the present invention does not distinguish between different types of data to be compressed and does not rely on specific image information such as pixel arrangement during the file compression process.

The compressed file is transmitted to one or more devices, e.g., STBs which can decompress the file when needed.

In one exemplary embodiment, the compressed image files of the present invention are used by a user interface of a STB. In the exemplary embodiment the user interface controls the retrieval of compressed image files and the processing of the files to generate image data suitable for display.

The compressed image file is decompressed when needed and the alpha data and color component data is reorganized so that the color component values and alpha value(s) corresponding to individual pixels are grouped together, e.g., the alpha and color component values are interspaced on a per pixel basis prior to the values being supplied to a rendering circuit, e.g., of a STB in the exemplary embodiment.

Encoding and processing complexity is reduced in accordance with the invention by using a conventional file compression algorithm and working in the native color component format required by the rendering circuit.

In particular, the amount of processing required to be performed by a processor in the device using the compressed image file is reduced as compared to systems where encoding algorithms optimized for images are used. This is because the general purpose file compression methods used in accordance with the present invention tend to be less complicated and therefore less processor intensive to implement than specialized image encoding algorithms. In addition, since the image data is in the format used by the rendering circuit as opposed to a format used by a specialized image encoding algorithm, the need for performing format conversion operations on color component values is avoided. For example, there is no need to convert from an RGB 888 implementation used by some image encoding algorithms to an RGB 565 format used by rendering circuits of various devices.

While described in the exemplary context of STBs, the image generation and compression methods of the present invention are well suited to a wide range of applications where images may be used by embedded applications which need to be run on a processor with processing capacity that has been limited by cost or other factors.

Various additional features and advantages of the present invention will be apparent from the detailed description which follows.

DETAILED DESCRIPTION

As discussed above, the present invention is directed to methods and apparatus for generating and compressing images, e.g., images which may be processed by an embedded application such as a user interface of a set top box ("STB"). While not being limited to the STB application, the methods and apparatus of the invention are well suited for STB applications and will be described in the context of a STB example. A STB may be, e.g., a cable box, intended to be used in conjunction with a television set or other type of display device.

Various features of the invention will now be described with reference to the figures which show exemplary apparatus and methods implemented in accordance with the invention.

Figure 1:
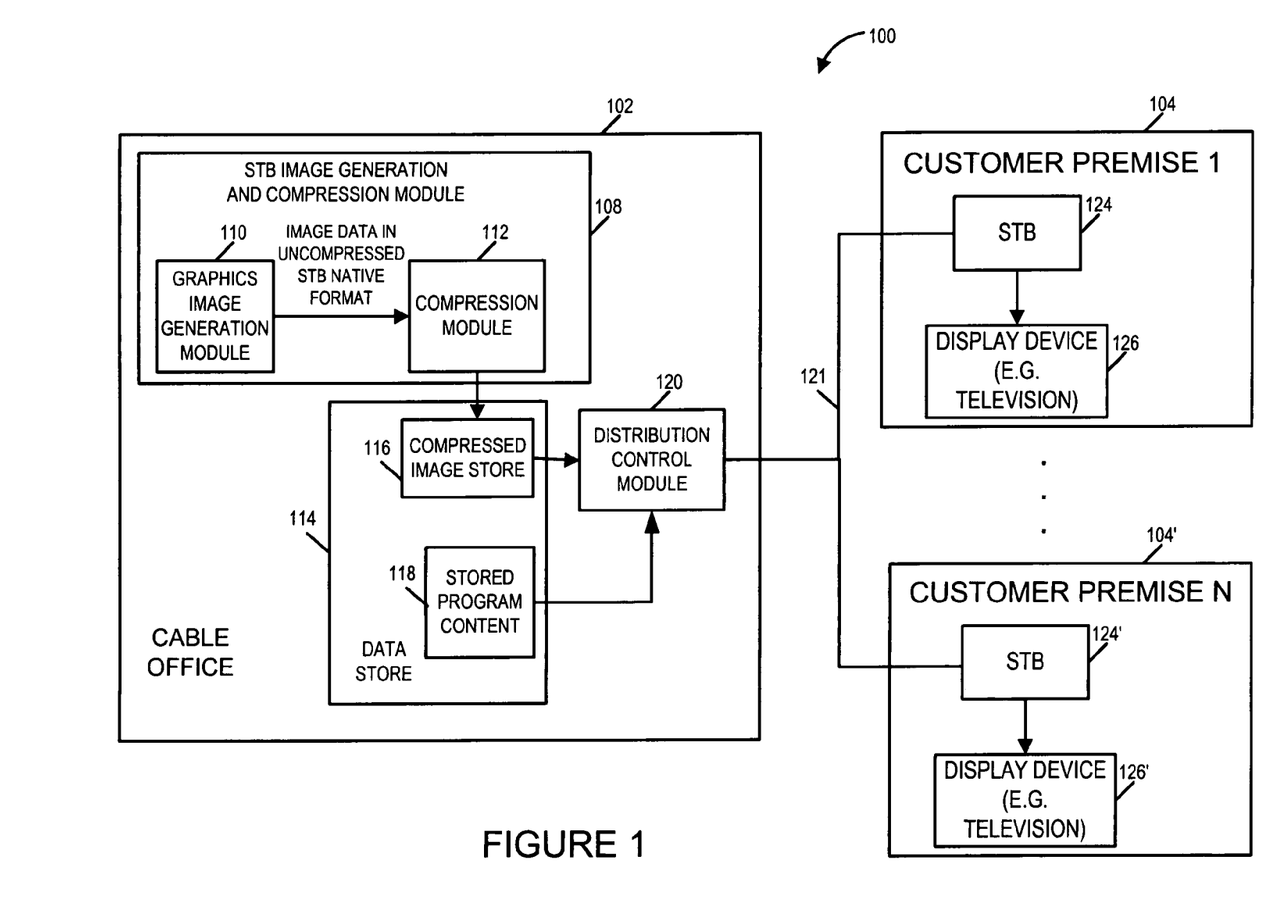
FIG. 1 illustrates an exemplary system implemented in accordance with the present invention.

FIG. 1 illustrates a communications system 100, e.g., a cable system, implemented in accordance with the present invention. The cable system 100 includes a cable office 102 which is coupled to a plurality of N customer premises 104 through 104' via cable 121. Each customer premise 104, 104' corresponds to a different physical location and includes a corresponding STB 124, or 124'. The STBs 124, 124, are coupled to corresponding display devices 126, 126', respectively. The display devices may be, for example television sets, monitors or some other form of display which can be used to display images supplied by the set top box 124, 124'.

The cable office 102 serves as a distribution point for television shows and for images which are to be displayed by the STB 124, 124' as part of a user interface. The images displayed as part of a STB user interface may include, e.g., all or a portion of images used as menus, from which a STB user can make selections, e.g., via an input device such as a remote control. In some cases, the images used by the STB user interface form a portion of a program guide. Such images which are used as part of a user interface are usually relatively small in size. In addition, the STB 124, 124' fully decodes such images prior to display.

The cable office 102 in the exemplary system 100 includes a STB image generation and compression module 108, a data store 114 and a distribution control module 120 which are coupled together as shown. The STB image generation and compression module 108 is responsible for generating and compressing images which are to be used by the user interfaces of STBs 124, 124'. The STB image generation and compression module 108 includes a graphics image generation module 110 which is coupled to a compression module 112. As will be discussed further below, in accordance with the invention the graphics image generation module 110 generates images intended to be used by the STB user interface in the native format of the STB, e.g., in a format that image data is supplied to a rendering circuit included within the STB. In one embodiment of the invention, the uncompressed native format is an RGB 565 format where 5 bits are used for the red component of a pixel, 6 bits are used for the green component of a pixel and 5 bits are used for a blue component of a pixel for a total of 16 bits per pixel. Thus, unlike other image generation systems which generated images using RGB 888 or other common image formats which treat each color element uniformly in terms of the number of bits used to represent the color component, the present invention intentionally generates images in the format used by the STB to reduce the processing which the STB has to perform to display the image.

The output of the graphics image generation module 110 is supplied to the input of compression module 112. The compression module 112 adds a header to the uncompressed data indicating the image type and whether or not it includes alpha data and then subjects it to compression in accordance with the invention. Compression module 112, separates the color data from the alpha data when present and then compresses the separate sets of color component values (RGB) values and alpha values using any one of a plurality of loss-less data compression methods, e.g., methods which are not specifically designed for encoding image data and do not involve knowledge that the data being compressed corresponds to pixels or even an image.

In various embodiments, a standard file compression program such as GZIP is used to compress the image file and to produce a compressed image data file. Thus, a file compression program as opposed to an image encoding algorithm is used in accordance with the invention. In contrast to image encoding/compression programs which require knowledge about the image being encoded, the file compression program used does not depend on knowledge about the image being encoded or manner in which the image is represented. The compressed file representing an image generated by compression module 112 includes, in some embodiments, a compressed file header generated by the compression program, the compressed data, a checksum and a file length indicator.

The compressed image file generated by compression module 112 is stored in compressed image store 116 of the data store 114. Distribution control module 120 controls when compressed images stored in the compressed image storage device 116 and/or stored program content in program storage 118 are retrieved and distributed to one or more STBs. Distribution of the compressed image files may be at predetermined times or in response to some signal communicated from one or more STBs 124, 124'.

Figure 2:
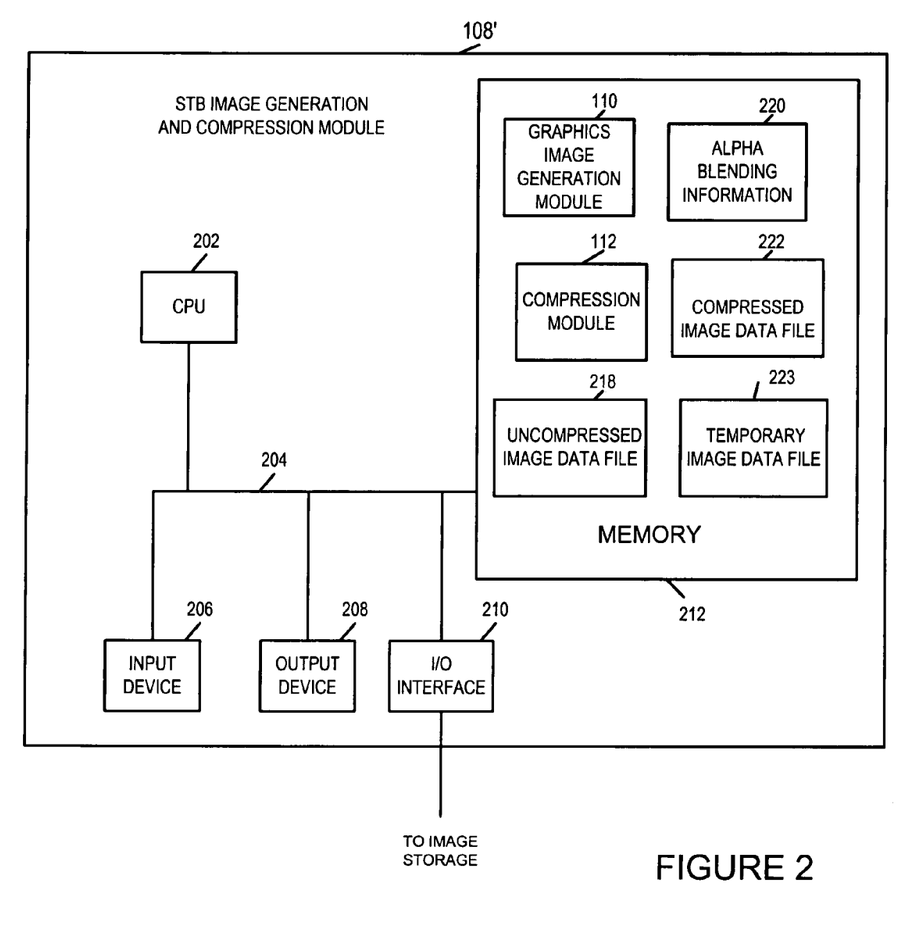
FIG. 2 illustrates am exemplary STB image generation and compression module, implemented in accordance with the invention, which can be used in the system of FIG. 1.

FIG. 2 illustrates, in greater detail then shown in FIG. 1, an exemplary STB generation and compression module 108' which may be used as the module 108 shown in FIG. 1.

The module 108' includes a processor, e.g., CPU 202, input device 206, output device 208, input/output (I/O) interface 210 and memory 212 which are coupled together via a bus 204. The module 108' may be implemented as a personal computer, dedicated workstation, or some computer system capable of implementing programs used to perform the image generation steps of the present invention. Input device 206 may be, e.g., a keypad, mouse or other type of input device. Output device 208 may be, e.g., a display device used to display images being generated and/or an image generation program such as a drawing program, paint program or other type of image generation program which can create images in the native format of a STB. I/O interface 210 may be, e.g., a bus interface and/or may include a router or other circuitry for coupling the STB image generation and compression module 108' to one or more potential sources of raw image data to be used in generating images. The I/O interface 210 provides a way for the module 108' to store information in the compressed image store 116 and to retrieve compressed image data from the store 116, e.g., for use in generating additional images.

In the FIG. 2 example, the STB image generation and compression module 108' operates in accordance with the present invention under the control of one or more modules, e.g., programs, stored in memory 212. The modules include a graphics image generation module 110 and a compression module 112 which operate as discussed with regard to FIG. 1. The memory 212 also includes alpha blending information 220 which provides information on alpha values to be used when the graphics image generation module 110 is operating in a mode which produces both color pixel values (e.g., RGB values) and alpha values used to control image blending.

Alpha values may vary for different portions of a user interface image and/or for a particular portion of the screen for which an image is intended to be displayed. Alpha blending information 220 provides the image generation module information which is used to determine the appropriate alpha values for an image being generated. In some embodiments, where alpha values are used, there can be one 8 bit per pixel alpha data value for each pixel of the image. In one embodiment where alpha values are used, the alpha channel will be fully opaque for a pixel when the pixel value is 0xff and fully transparent when the pixel value is 0.

The graphic image generation module 110 generates uncompressed images. Each image is normally stored in a separate file for processing by the compression module 112. File 218 represents one uncompressed image data file which may be stored in memory for processing by the graphic image generation module 110. Multiple files 218 corresponding to different images may be stored in memory at any point in time. During the processing of the uncompressed image data file by the compression module 112, a header is added and alpha data, when present, is separated from the color component data. As part of the processing performed by compression module 112, a temporary image data file 223 with alpha data separate from color component data may be generated. The file 223 is subjected to a file compression operation performed by the graphics image generation module 110 to produce a compressed image data file, e.g., compressed image data file 222. The compressed image data file 222 may be stored briefly in memory 212 prior to being supplied to the image store 116 for distribution. Examples of an uncompressed image data file 218, temporary image data file 223 and compressed image data file 222 will be discussed in more detail below with reference to FIGS. 6, 7 and 8, respectively, in the context of flow charts 4 and 5 which are used to explain the method of the present invention.

Figure 3:
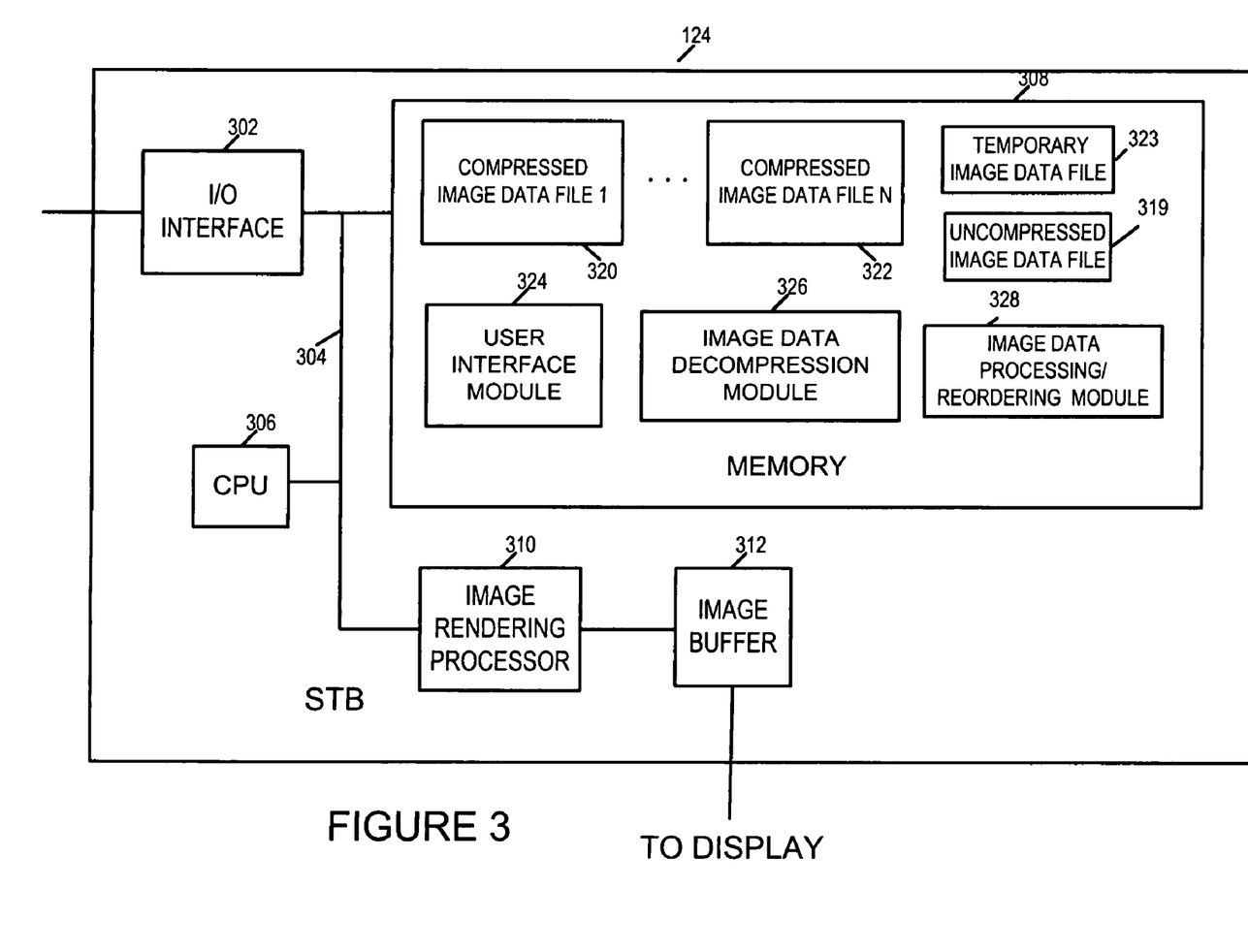
FIG. 3 illustrates an exemplary STB implemented in accordance with the invention which can be used in the system of FIG. 1.

FIG. 3 illustrates an exemplary STB 124, implemented in accordance with the invention, which can be used in the system of FIG. 1. The STB 124 includes an input/output (I/O) interface 302, memory 308, a general purpose processor, e.g., CPU 306, and an image rendering processor 310 coupled together by a bus 304. The I/O interface 302 provides a connection to other cable system elements, e.g., the cable office, via a cable connection. The memory 308 includes a user interface module 324, an image data decompression module 326 and an image data processing and/or reordering module 328. In addition to these modules which can be used to control various user interface features, the memory 308 includes a plurality of compressed image data files 320, 322, one or more temporary image data files 323 and one or more uncompressed image data files 319.

The user interface module 324, when executed by the CPU 306, is responsible the presentation of menus and/or other information to a viewer as part of a user interface. The user interface module 324 determines what image is to be presented and when. When an image is selected to be displayed by the user interface module 324, the compressed image data file, e.g., data file 320 or 322, which stores the image to be processed is retrieved and supplied to the image data decompression module 326. Decompression module 326 performs a file decompression operation to recover the original image data in an uncompressed format. As part of the decompression process, a temporary image data file 323 having a content the same as or similar to the temporary image data file 223 generated during the compression process, is generated as part of the decompression process. The decompressed file includes color pixel data, e.g., a set of RGB values in the native format of the STB and, if alpha values are present, a separate set of uncompressed alpha values. Notably, since the image data was represented in the native format used by the STB and was compressed with a simple file compression routine, it is possible to decompress the compressed image data to obtain image data in the native format used by the image rendering processor 310. Thus, in contrast to previous systems which used image encoding algorithms to compress image data which was in a format that did not match the native image format used by the STB 124, it is possible to decode the image data usually with less processing operations than would be required if a specialized image compression method were used to compress the file. Furthermore, since the image data is in the native format of the STB there is no need to convert the image data from one representation format, e.g., a first number of bits per pixel, to a second format, e.g., which uses a different number of bits per pixel. While color data in the decompressed file is in the native format of the STB, if alpha data is being used as part of the encoding process of the invention it would have been separated from the color data for compression purposes.

When alpha values are present, the image data decompression module 326 proceeds to call the image data processing/reordering module 328 which is responsible for reorganizing the uncompressed data in the temporary image data file 323 so that the color and alpha data for an individual pixel are stored together rather than in separate sets of color data and alpha data. The reordered data, is stored in the uncompressed image data file 319 which includes data in the native format used to supply image data to the image rendering processor 310.

The image rendering processor 310, which may be implemented as a dedicated graphic processor chip, requires that image data to be processed for display be supplied in a particular predetermined format which, in most embodiments, allows for the optional use of alpha values in addition to color component values for each pixel of an image in a particular format. The input format of the image rendering processor 310, in this example, is referred to as the native image format of the STB 124. The image rendering processor 310 is responsible for preparing images for display and for loading the prepared images into image buffer 312 which is coupled to a display.

Figure 4:
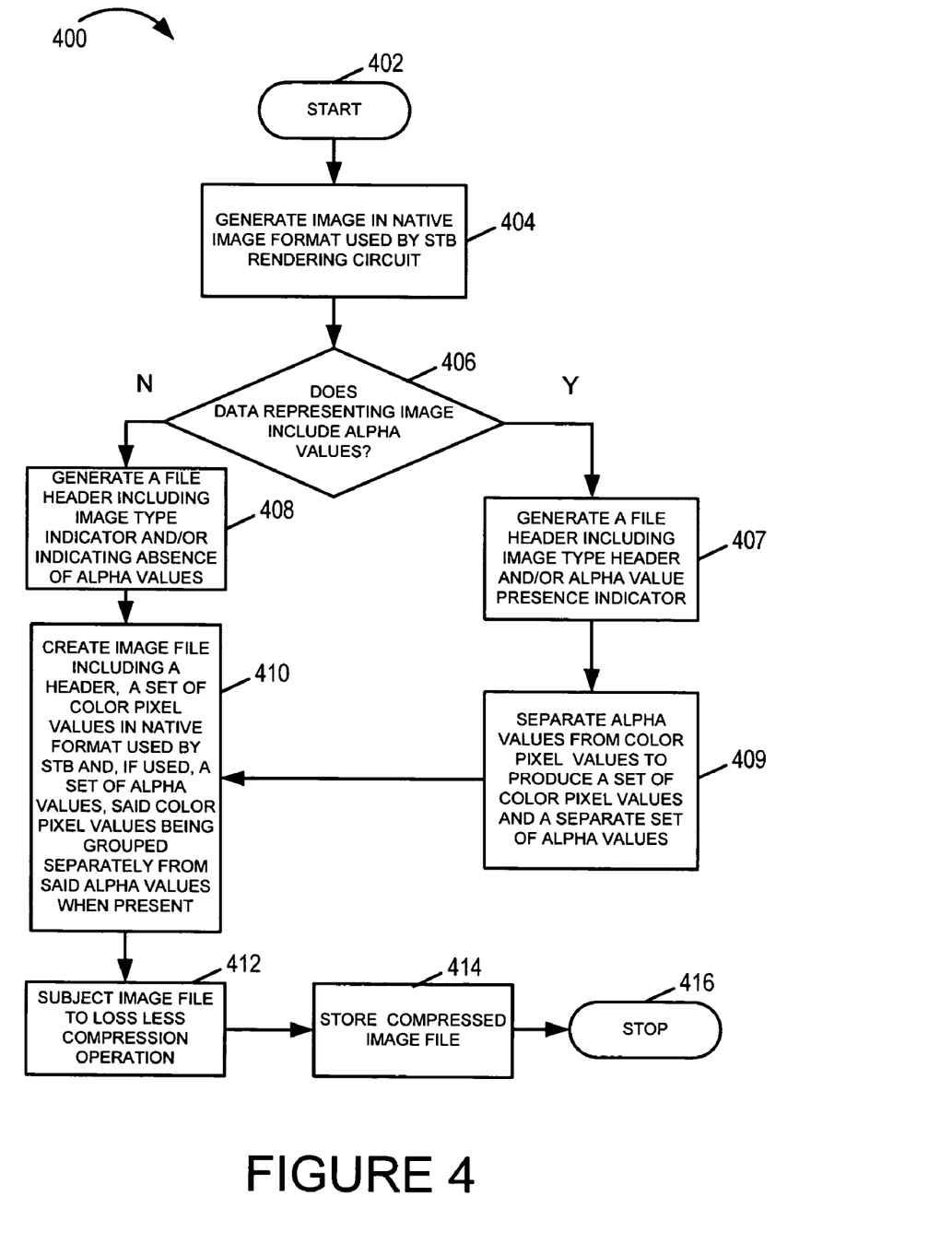
FIG. 4 illustrates a flow chart showing the steps of a method of generating and compressing image data in accordance with the invention.

An exemplary image generation and compression process implemented in accordance with the present invention will now be explained in greater detail with reference to FIG. 4. FIG. 4 is a flowchart showing the steps 400 of an exemplary STB image generation and compression method which may be implemented by the exemplary STB image generation and compression module 108'. The method begins in start step 402 with the graphics image generation module being executed. In step 404 an image is generated in the native image format used by a STB rendering circuit that is included in a STB for which the image is being generated.

In one exemplary embodiment the image is generated in an RGB 565 format with 5 bits being used to indicate the intensity of the red component of a pixel, 6 bits being used to indicate the intensity of the green pixel component and another 5 bits being used to represent the intensity of the blue pixel component. In cases where alpha information is to be used in conjunction with the color component information, an alpha value is generated for each pixel of the image in addition to the RGB color component values. The RGB values and corresponding alpha value, when present, are normally stored together on a per pixel basis.

Figure 6:
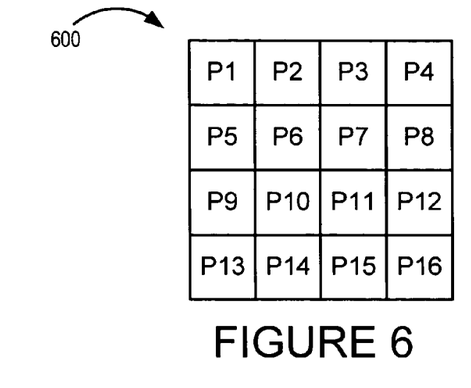
FIG. 6 illustrates a 4×4 image which is used to explain various features of the invention.

Referring now briefly to FIG. 6, FIG. 6 illustrates an exemplary image 600 which may be represented by the image data generated in step 404. The image 600 includes 4 rows and 4 columns of pixels for a total of 16 pixels, identified as P1 through P16. As is common, the pixels are labeled starting at the top left corner and ending at the bottom right corner of the image 600. In many applications, e.g., progressive display applications, this is the order in which the pixels would be displayed on a display device.

Figure 7:
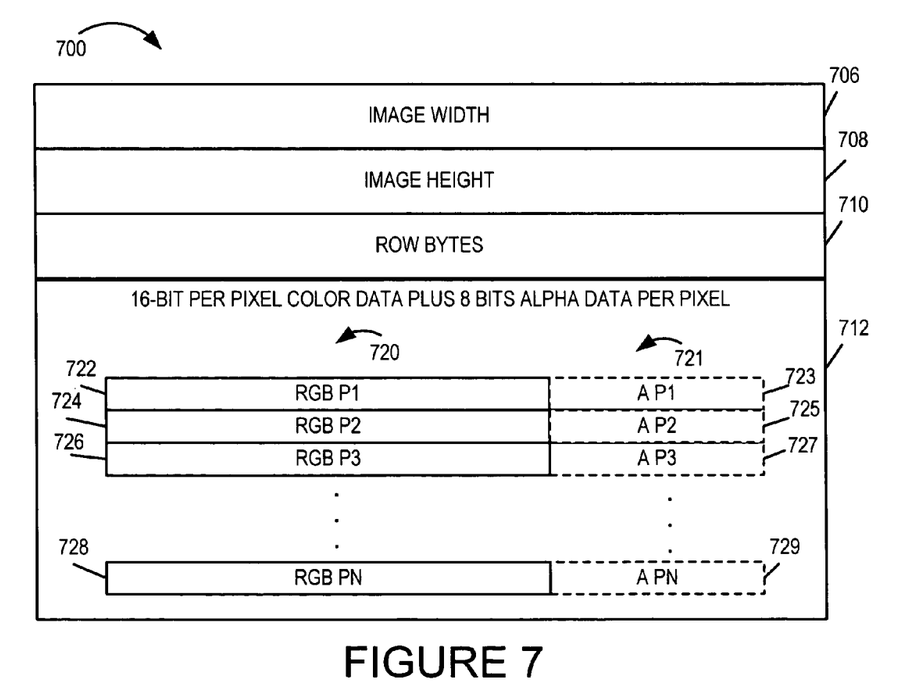
FIG. 7 is an example of a set of uncompressed image data in the native format used by a set top box.

An exemplary set of image data 700, in the native format of the STB for which the image is intended, includes an image width indicator 706, an image height indicator 708, a bytes per row (row bytes) indicator 710 and a set of pixel data 712.

In the case of the exemplary image of FIG. 6, the image width indicator 706 would be set to 4 indicating the image is 4 pixels wide and the image height indicator 708 would be set to 4 indicating the image is 4 pixels high. The row bytes indicator is used to indicate the number of bytes used per image row to represent the color component information. If present, the row bytes indicator will not include the alpha value bits. In the case where 16 bits are used per pixel for the color information, given that a byte has 8 bits, the bytes per row indicator would be set to 2 times the number of pixels in the row (2 times the value of the width indicator in this case). The number of bytes per row will be different when the number of bits per pixel is different from the example of 16 bits. In the case of the FIG. 6 example, the bytes per row indicator 710 would be 8 since each row includes 4 pixels and each pixel includes 2 bytes of color information.

The set of pixel data 712 includes per pixel color data 720 and the corresponding per pixel alpha data 721 with the color and alpha data for each pixel being stored together resulting in a set of data 712 with interspersed color and pixel values arranged in the order in which the pixels appear in the image, e.g., as numbered from top left to bottom right in this particular example. Thus, the color data 722 for pixel P1 is stored first followed by the corresponding alpha data 723 for pixel P1. Color data 724 for pixel P2 follows alpha data 723 for pixel P1 and is, in turn, followed by an alpha value 725 for pixel P2. Next follows color data 726 and alpha data 727 for pixel P3. The arrangement of color data and alpha data continues in the generated set of image data until it ends with the color data 728 and alpha data 729 for the last pixel in the image.

In embodiments where alpha values are not used, the alpha values 721 would be omitted from the data set 712.

Having described a set of uncompressed image data that may be generated in image generation step 404, the discussion will now return to the processing performed in the method shown in FIG. 4. In step 406 which follows the image generation step 404, a determination is made as to whether or not the uncompressed image data, e.g., the set of data 700, includes alpha values.

If the image data includes alpha values, operation proceeds to step 407. In step 407 a file header is generated including image type information and, if not conveyed by the image type, in some cases an indicator value that indicates that alpha values are included in the file. In one embodiment an image type of 0x0001 is used to indicate an image represented in RGB 565 format while the value 0xFF00 is used to indicate an image in RGB 565 format with Alpha values. Other image type values can be used to indicate files corresponding to other types of uncompressed images. Operation then proceeds to step 409 where the alpha values are separated from the pixel color component values so that the pixel color values and alpha values are arranged in separate sets, e.g., with the data in each set being arranged in order as they appear in the image. Operation proceeds from step 409 to step 410.

If in step 406 it is determined that alpha values are not present in the generated image data, operation proceeds to step 408. In step 408, a file header including an image type indicator and/or an alpha value indicator indicating the absence of alpha values is generated. Operation proceeds from step 408 to step 410.

In step 410 an uncompressed image file is generated which includes the header and/or alpha value indicator generated in step 407 or 408. In addition, the file includes a set of color pixel values and, if alpha values are present, a separate set of alpha values which correspond to the pixels for which pixel color information is provided.

Figure 8:
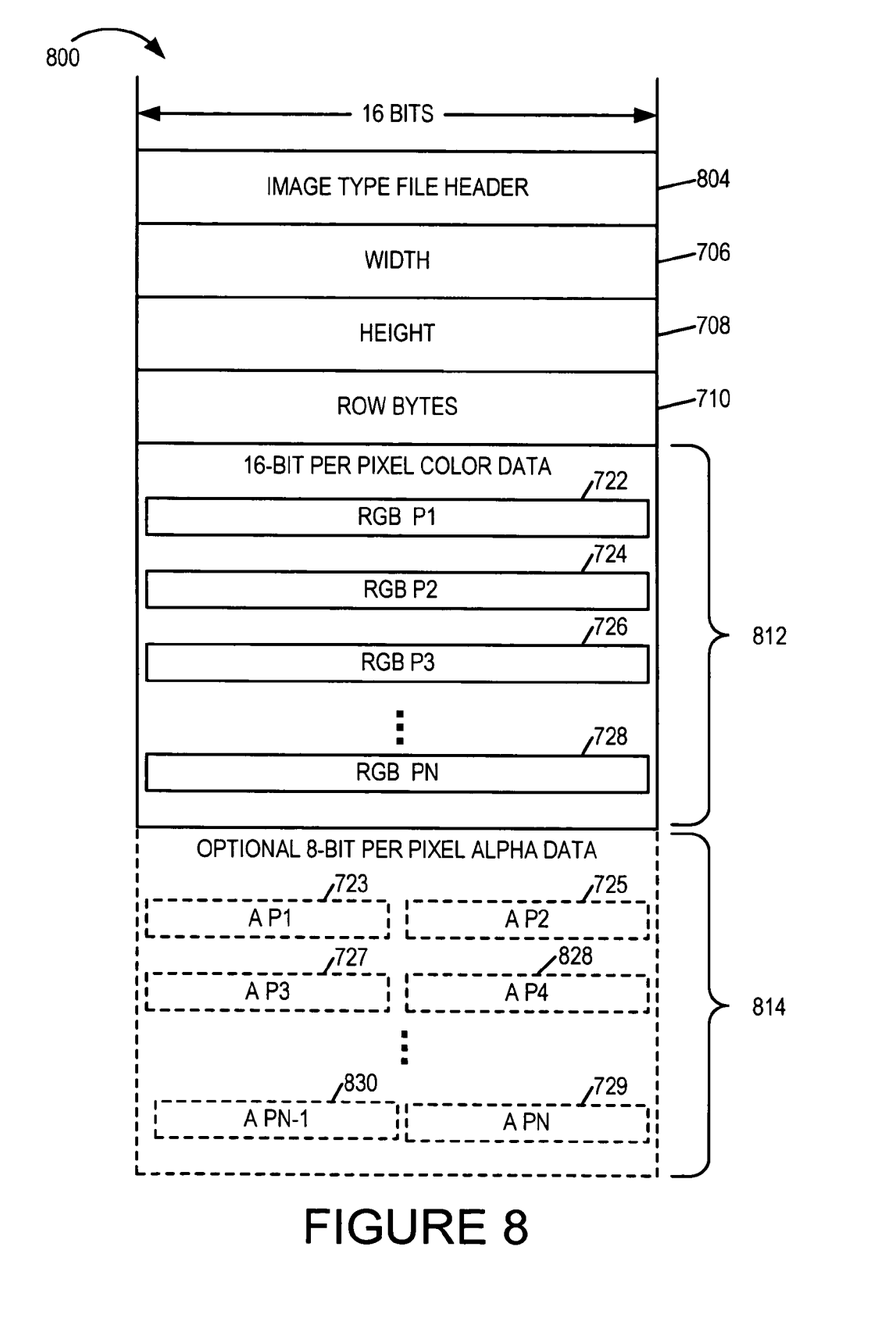
FIG. 8 is an example of an uncompressed image file, generated by processing the exemplary image data of FIG. 7 in accordance with the invention.

FIG. 8 illustrates an exemplary file 800 which may be generated by the processing performed in step 410. The file 800 may be implemented as a sequential array of 16 bit wide data elements as shown in FIG. 8. The file 800 includes much of the information present in the exemplary set of image data 700 but in a rearranged form which is intended to facilitate data compression by a file compression method and with the addition of an image type file header 804. The same reference numbers are used in FIGS. 7 and 8 to indicate the same or similar data in each of the figures. Notably, in the uncompressed image file 800 of FIG. 8, the color pixel values 722, 724, 726, 728 are arranged in a first set of data 812 while the alpha values 723, 725, 727, 828, 830, 729 are grouped together, when present, in a separate set of data 814. In this particular implementation, the alpha data follows the pixel data when stored, e.g., in a memory or on a disk based storage device and is not interspersed with the color component values.

The image file generated in step 410, is subjected in step 412 to a lossless compression operation, e.g., using any one of a plurality of available file compression routines. In one exemplary embodiment, a file compression program which performs file compression in accordance with the GZIP file compression standard is used. The GZIP file compression standard is described in RFC 1952. This results in a compressed image file such as the exemplary image file 900 shown in FIG. 9. Notably, unlike specifically designed image compression algorithms which rely on complex encoding procedures which rely on knowledge of which portions of the data being encoded represent pixels and/or specific image information, the use of a generalized file compression algorithm normally involves less complex processing since it doesn't distinguish between what different portions of the data file based on the type of information presented. Thus, the file compression method used will compress file header data, width, color pixel data and, if present, alpha pixel data using the same compression procedure regardless of the type of data being compressed. While this would normally result in a less compact representation of image data, by separating color and alpha data, satisfactory compression results have been achieved.

Figure 9:
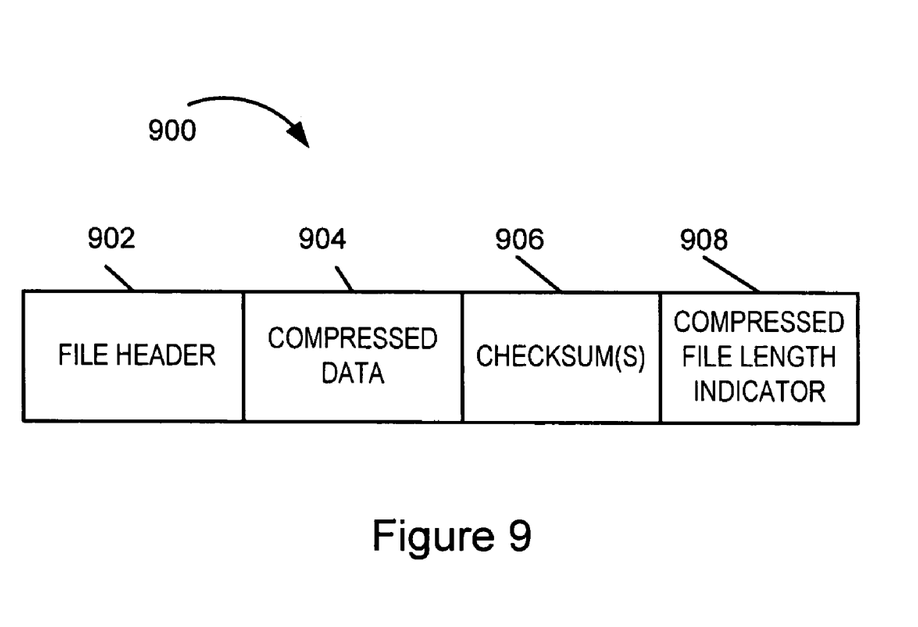
FIG. 9 illustrates a compressed image file resulting from processing the image file of FIG. 8 in accordance with the present invention.

This is because such general compression algorithms tend to work well when values which are close to one another numerically are stored adjacent or near one another within a file. Alpha values tend to be similar for multiple pixels in the case of images generated for applications such as the user interface of a set top box. RGB color component values corresponding to a pixel also tend to be relatively close to one another making the arrangement of RGB data on a per pixel basis beneficial.

Interestingly, during actual implementations, it was found that separating R, G and B data into separate groups prior to compression by a file compression algorithm actually tended to increase the resulting compressed file size in many cases. This appears to be the result of color component values changing from pixel to pixel, in many images, more than then the color component values change within a pixel.

Significantly, it has been found that for small images such as those commonly used to implement a portion of a menu that might be used in a set top box interface, the resulting file 900 is, in many cases, the same or smaller in size than a file created using a conventional image or video compression algorithm rather than a file compression algorithm.

The exemplary compressed data file shown in FIG. 9 includes a file header 902 which is the file header for the compressed data file and which identifies the file as a file which was compressed according to the utilized file compression method. Following the file header 902 is the compressed file data 904. This compressed file data includes, in compressed form, the full content of the uncompressed image file, e.g., file 800. In addition, the file 900 includes one or more checksums 906 which can be used for detecting and/or correcting errors. At the end of the file is a compressed file length indicator 908 which indicates the length of the compressed file 900. The checksums may extend across data of different types, e.g., with a single checksum being applicable to the compressed representation of the uncompressed file header 804, the compressed representation of the image width and/or pixel data information.

The compressed image file 900 can be transmitted to various STBs 124, 124' for storage and use by the STB's user interface module 324. Use of a compressed image file of the present invention, such as the file 900, will now be discussed with regard to the exemplary flowchart of FIG. 5.

Figure 5:
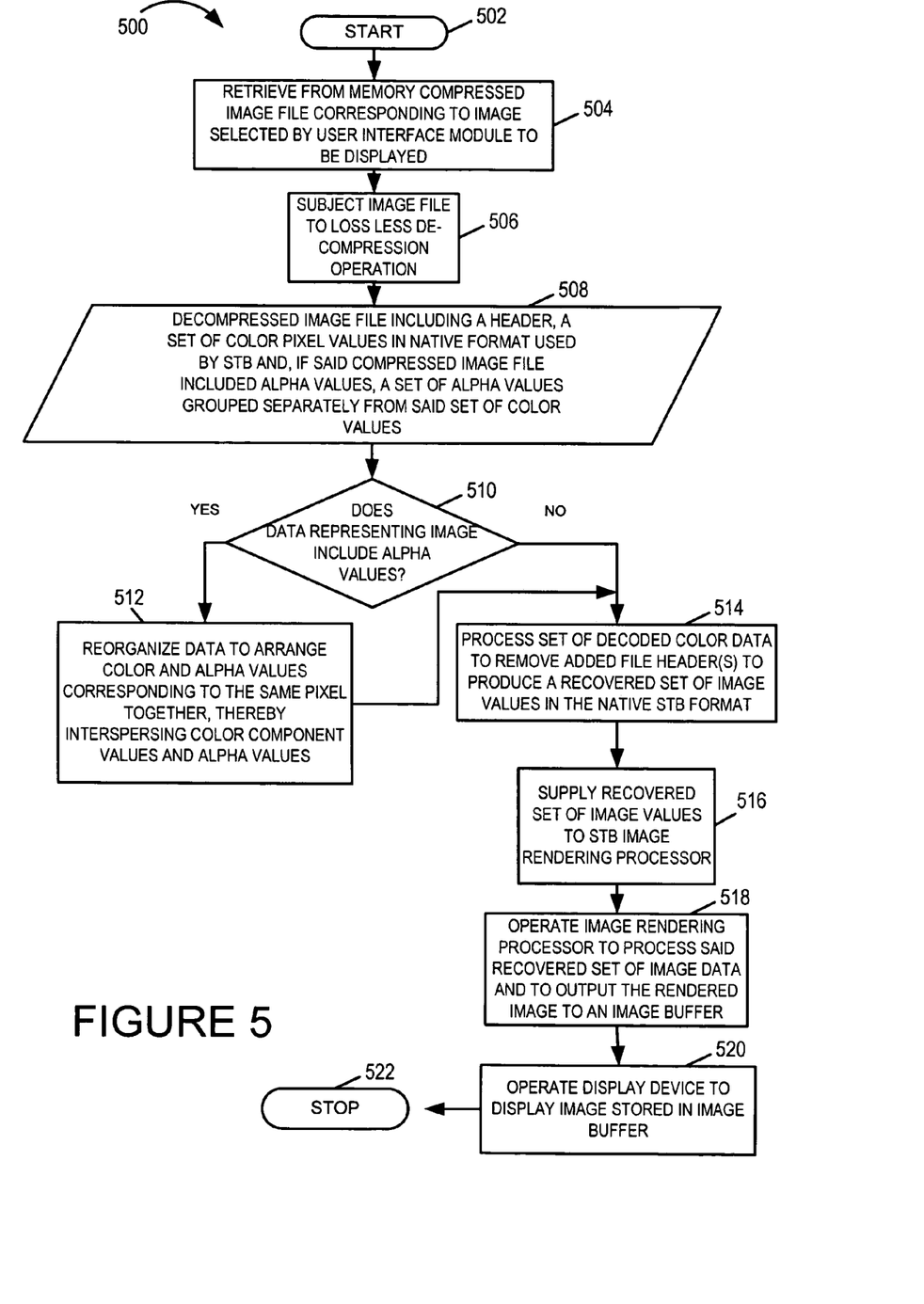
FIG. 5 illustrates a flow chart showing the steps of a method performed by a STB in accordance with one exemplary embodiment of the present invention.

FIG. 5 shows the steps of an image file decompression and image display method performed by a set top box in accordance with one exemplary embodiment of the present invention. The method 500 starts in step 502, e.g., when the user interface module 324 of a STB 124 determines an image is to be displayed. In step 504, the compressed image file, e.g., a file 900 of the type shown in FIG. 9, corresponding to the image to be displayed is retrieved from memory for processing. Next, in step 506 the retrieved image file 900 is subjected to a lossless file decompression operation, e.g., the inverse of the file compression operation used to generate the file 900. This produces a decompressed image file 508, which includes a file type header indicating the image type, a set of color component pixel values and, if alpha values were included with the image, the included alpha values. The recovered file, if it includes alpha values, will have them grouped separately from the color component values. The decompressed image file 508 may be the same as, or similar to, the uncompressed image file 800 generated prior to file compression.

The decompressed image file 508 is examined in step 510 to determine if it includes alpha values. If it includes alpha values, operation proceeds to step 512. In step 512 the color component values and the alpha values are reorganized to arrange color values and alpha values correspond to the same pixel together, thereby interspersing color component values and alpha values. This step, and step 514 which follows, may be performed by the STB's image data processing/reordering module 328.

In step 514, the header indicating the image type and/or presence of alpha data is stripped from the image data to produce a recovered set of image values in the native format of the STB 124. The resulting set of uncompressed image data may be the same as, or similar to, the set of image data 700 shown in FIG. 7.

Thus, in accordance with the invention, by simply decompressing the image file, reordering the contents if alpha values are present, and removing one or more headers, the STB is able to obtain an image in the native format of the image rendering processor. Accordingly, color component format conversions and/or other processor intensive image format conversions are not required before the image data is ready to be supplied to the image rendering processor.

The set of image data, in the native format of the STB's image rendering processor produced in step 514, is supplied in step 516 to the image rendering processor 310. Then, in step 518, the image rendering processor 310 is operated to process the supplied set of image data and to produce, from the supplied set of image data, a rendered image which is output to the image buffer 312. The display device receives the contents of the image buffer and displays the image in step 520. With the image displayed, processing of the image data stops in step 522. However, the user interface may continue to select other stored images for display and processes them accordingly so that they are displayed at the appropriate time.

In various embodiments system elements described herein are implemented using one or more modules which are used to perform the steps corresponding to one or more methods of the present invention, for example, file compression, data rearrangement, file header generation, etc. Such modules may be implemented using software, hardware or a combination of software and hardware. Each step may be performed by one or more different software instructions executed by a processor, e.g., CPU.

At least one system implemented in accordance with the present invention includes a means for implementing the various steps which are part of the methods of the present invention. Each means may be, e.g., an instruction, processor, hardware circuit and/or combination of elements used to implement a described step.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of processing image data for use in a set top box including a rendering circuit that uses image data supplied in a predetermined image format, image data in said predetermined image format including color component values for each pixel of an image, the method comprising:
   generating a set of uncompressed image data in the predetermined image format, said uncompressed image data including color component values for each pixel of the image represented by said set of uncompressed image data;
   generating a first file header indicating information about said set of uncompressed image data;
   utilizing said first file header with said color component values from said uncompressed image data to generate an uncompressed image file; and
   performing a file compression operation on said uncompressed image file, said file compression operation generating a compressed image file including a set of compressed data representing said uncompressed image file in a compressed form.

2. A method of processing image data for use in a set top box including a rendering circuit that uses image data supplied in a predetermined image format, image data in said predetermined image format including color component values for each pixel of an image, the method comprising:
   generating a set of uncompressed image data in the predetermined image format, said uncompressed image data including color component values for each pixel of the image represented by said set of uncompressed image data;
   generating a first file header indicating information about said set of uncompressed image data;
   utilizing said first file header with said color component values from said uncompressed image data to generate an uncompressed image file;
   performing a file compression operation on said uncompressed image file, said file compression operation generating a compressed image file including a set of compressed data representing said uncompressed image file in a compressed form; and
   wherein said predetermined image format is a native format of said rendering circuit, the method further comprising:
   sending said compressed image file to a said set top box;
   operating said set top box to:
      decompress said compressed image file to thereby recover said set of color component image values; and
      operate the rendering circuit in said set top box to process the recovered set of color component image values without said recovered set of color component image values undergoing a format conversion prior to processing by said rendering circuit.

3. The method of claim 2, wherein said predetermined image format is an RGB 565format.

4. A method of processing image data for use in a set top box including a rendering circuit that uses image data supplied in a predetermined image format, image data in said predetermined image format including color component values for each pixel of an image, the method comprising;
   generating a set of uncompressed image data in the predetermined image format, said uncompressed image data including color component values for each pixel of the image represented by said set of uncompressed image data;
   generating a first file header indicating information about said set of uncompressed image data;
   utilizing said first file header with said color component values from said uncompressed image data to generate an uncompressed image file;
   performing a file compression operation on said uncompressed image file, said file compression operation generating a compressed image file including a set of compressed data representing said uncompressed image file in a compressed form;
   wherein said file compression operation is a GZIP file compression operation; and
   wherein said first file header indicates one of a first file type that indicates a file that includes alpha values and a second file type that indicates a file that does not include alpha values.

5. A method of processing image data for use in a set top box including a rendering circuit that uses image data supplied in a predetermined image format, image data in said predetermined image format including color component values for each pixel of an image, the method comprising:
   generating a set of uncompressed image data in the predetermined image format, said uncompressed image data including color component values for each pixel of the image represented by said set of uncompressed image data;
   generating a first file header indicating information about said set of uncompressed image data;
   utilizing said first file header with said color component values from said uncompressed image data to generate an uncompressed image file;
   performing a file compression operation on said uncompressed image file, said file compression operation generating a compressed image file including a set of compressed data representing said uncompressed image file in a compressed form; and
   wherein generating a set of uncompressed image data further includes:
   generating a set of alpha values, at least one alpha value being generated per image pixel; and wherein utilizing said first file header with said color component values from said uncompressed image data further includes:
storing said color component values in said uncompressed image file separately from said alpha values which are also stored in said uncompressed.

6. The method of claim 5,
wherein pixels occur in said image in an order determined by an arrangement of pixels in rows;
wherein storing said color component values in said uncompressed image file includes storing said color component values in an order corresponding to the order of the pixels in said image to which said color component values correspond; and
wherein storing said alpha values in said uncompressed image file includes storing said alpha values corresponding to each pixel of an image in said file in the order in which the pixels to which the alpha values correspond occur in said image.

7. The method of claim 6, wherein said alpha values are stored in said uncompressed image file before or after said color component values but are not interspersed with said color component values.

8. The method of claim 7, further comprising:
sending said compressed image file to said set top box;
operating said set top box to:
decompress said compressed image file to thereby recover said set of color component image values and said set of alpha values;
rearrange said recovered color component image values and said recovered alpha values to arrange the recovered alpha value corresponding to a pixel with the recovered color component image values corresponding to the same pixel thereby producing a set of recovered image data including interspersed color component image values and alpha values; and
operate the rendering circuit in said set top box to process the said set of recovered image data including interspersed color component image values and alpha values without modification of said recovered color component image values prior to processing by said rendering circuit.

9. A method of operating a set top box, the method comprising:
receiving a compressed image file;
decompressing said compressed image file to recover a set of uncompressed color component values in a predetermined format used by an image rendering circuit included in said set top box; and
supplying the uncompressed color component values included in said set of uncompressed color component values to said image rendering circuit without altering the values included in said set of color component values.

10. A method of operating a set top box, the method comprising:
receiving a compressed image file;
decompressing said compressed image file to recover a set of uncompressed color component values in a predetermined format used by an image rendering circuit included in said set top box;
supplying the uncompressed color component values included in said set of uncompressed color component values to said image rendering circuit without altering the values included in said set of color component values;

wherein said received compressed image file includes a set of alpha values in addition to said set of uncompressed color component values, each alpha value and each uncompressed color component value corresponding to one of a plurality of pixels in an image represented by the data in said compressed image file; and
wherein said step of decompressing said compressed image file generates a set of uncompressed alpha values in addition to said set of uncompressed color component values, the method further comprising:
processing said set of uncompressed color component values and said set of uncompressed alpha values to produce a set of interspersed uncompressed color component values and uncompressed alpha values, at least one color component value corresponding to a pixel being located in said set of interspersed values adjacent to an uncompressed alpha value corresponding to the same pixel as the adjacent uncompressed color component value.

11. The method of claim 10, wherein the uncompressed color component values are represented in an RGB 565 format.

12. The method of claim 11, wherein said step of decompressing said compressed image file includes performing a GZIP file decompression operation.

13. The method of claim 10,
wherein said predetermined format is a native image format of said rendering circuit; and
wherein said step of decompressing said compressed image file includes:
recovering a file header from the compressed image file indicating whether or not alpha data is included in the file that was decompressed.

14. An image generation and processing method, comprising:
generating a first set of image data including color component values and at least one alpha value for each pixel of an image that includes a plurality of pixels, said color component values and alpha values being interspersed in said set of image data;
rearranging the color component values and said alpha values in said set of image data to group said color component values in a second set of image data and to group said alpha values in a third set of image data;
storing said second and third sets of image data in an uncompressed image file without interspacing said color component values included in said second set of image data and the alpha values included in said third set of image; and
performing a file compression operation on said uncompressed image file to generate a compressed image file.

15. The method of claim 14, wherein said file compression operation is not dependent on the type information represented by the data stored in the file, said file compression operation compressing color component values and alpha values using the same compression technique.

16. The method of claim 14,
wherein said generated image is for use by a set top box including an image processing circuit which requires unencoded image data to be supplied in a particular format; and
wherein said step of generating a first set of image data including color component values and at least one alpha value includes generating said values in said particular unencoded format.

17. The method of claim 16, wherein said particular format includes representing color component values in an RGB 565 format.

18. The method of claim 17, wherein said file compression operation is a GZIP file compression operation.

19. The method of claim 16, further comprising:
transmitting said compressed image file to a set top box;
operating a general purpose processor in said set top box to decompress said compressed image file and thereby recover said second set of image data including color component values and said third set of image data including alpha values;
operating the general purpose processor in said Set top box to reorganize the uncompressed color component values in said second set of image data and alpha values in said third set of image data to generate a fourth set of image data including color component values corresponding to a pixel arranged adjacent an alpha value corresponding to the same pixel; and
operating an image rendering circuit to perform an image rendering operation on the fourth set of image data.

20. A system for processing image data for use in a set top box that includes a rendering circuit that uses image data supplied in a predetermined image format, image data in said predetermined image format including color component values for each pixel of an image, the system comprising:
means for generating a set of uncompressed image data in the predetermined format, said uncompressed image data including color component values for each pixel of the image represented by said set of uncompressed image data;
means for generating a first file header indicating information about said set of uncompressed image data;
means for utilizing said first file header with said color component values from said uncompressed image data to generate an uncompressed image file; and
means for performing a file compression operation on said uncompressed image file, said file compression operation generating a compressed image file including a set of compressed data representing said uncompressed image file in a compressed form.

21. A system for processing image data for use in a set top box that includes a rendering circuit that uses image data supplied in a predetermined image format, image data in said predetermined image format including color component values for each pixel of an image, the system comprising:
means for generating a set of uncompressed image data in the predetermined format, said uncompressed image data including color component values for each pixel of the image represented by said set of uncompressed image data;
means for generating a first file header indicating information about said set of uncompressed image data;
means for utilizing said first file header with said color component values from said uncompressed image data to generate an uncompressed image file;
means for performing a file compression operation on said uncompressed image file, said file compression operation generating a compressed image file including a set of compressed data representing said uncompressed image file in a compressed form; and
wherein said predetermined image format is a native format of said rending circuit, and
wherein the system further includes:
means for sending said compressed image file to said set top box.

22. The system of claim 21, wherein said predetermined image format is an RGB 565 format.

23. The system of claim 22,
wherein said file compression operation is a GZIP file compression operation; and
wherein said first file header indicates one of a first file type that indicates a file that includes alpha values and a second file type that indicates a file that does not include alpha values.

24. A system for processing image data for use in a set top box that includes a rendering circuit that uses image data supplied in a predetermined image format, image data in said predetermined image format including color component values for each pixel of an image, the system comprising:
means for generating a set of uncompressed image data in the predetermined format, said uncompressed image data including color component values for each pixel of the image represented by said set of uncompressed image data;
means for generating a first file header indicating information about said set of uncompressed image data;
means for utilizing said first file header with said color component values from said uncompressed image data to generate an uncompressed image file; and
means for performing a file compression operation on said uncompressed image file, said file compression operation generating a compressed image file including a set of compressed data representing said uncompressed image file in a compressed form; and
wherein said means for generating a set of uncompressed image data includes:
means for generating a set of alpha values, at least one alpha value being generated per image pixel; and
wherein said means for utilizing said first file header with said color component values from said uncompressed image data further includes:
means for storing said color component values in said uncompressed image file separately from said alpha values which are also stored in said uncompressed image file.

25. The system of claim 24,
wherein pixels occur in said image in an order determined by the arrangement of pixels in rows; and
wherein means for storing said color component values in said uncompressed image file: i) arranges said color component values corresponding to each pixel in of an image in an order corresponding to the order in which the pixels color component values correspond occur in said image and ii) stores said alpha values corresponding to each pixel of the image in said file in the order in which the pixels to which the alpha values correspond occur in said image.

26. The system of claim 25, wherein said means for storing stores alpha values in said uncompressed image file before or after said color component values but not interspersed with said color component values.

27. The system of claim 26, further comprising:
said set top box, said set top box including:
i) means for decompressing said compressed image file to thereby recover said set of color component image values and said set of alpha values;
ii) means for rearranging said recovered color component image values and said recovered alpha values to arrange the recovered alpha value corresponding to a pixel with the recovered color component image values corresponding to the same pixel thereby producing a set of recovered image data including interspersed color component image values and alpha values; and iii) said rendering circuit, said rendering circuit being coupled to said means for rearranging to receive, from said means for rearranging, said set of recovered image data including interspersed color component image values and alpha values.

28. A set top box, comprising:

an image rendering circuit which requires image data to be processed by said image rendering circuit to be supplied in a particular unencoded image format;

a memory including at least one compressed image file, said compressed image file including compressed color component image values and compressed alpha values stored in said image file, said compressed color component image values and compressed alpha values corresponding to an image represented by said compressed image file;

means for decompressing said compressed image file to generate an uncompressed image data file including a set of color component image values and a separate set of alpha values; and means for reordering values in said uncompressed image data file to produce a set of uncompressed image data in said particular image format which is the native format of said image rendering circuit, said set of uncompressed image data including, for each pixel of an image, color component image values corresponding said pixel arranged with an alpha value corresponding to said pixel, said set of uncompressed image data including interspersed color component values and alpha values corresponding to multiple pixels of said image.

29. The set top box of claim 20, wherein said particular unencoded image format is a native image format of said image rendering circuit; and wherein said means for decompressing includes a file decompression routine.

30. The set top box of claim 21, wherein said file decompression routine is a GZIP file decompression routine.

31. The set top box of claim 21, wherein said particular image format represents color components in an RGB 565 format.

32. A system for processing image data for use in a set top box that includes a rendering circuit that uses image data supplied in a predetermined image format, data in the predetermined image format including color component values for each pixel of an image, the system comprising:

a graphics image generation module for generating an uncompressed graphics file including a set of uncompressed image data in said predetermined image format which is native format of said rendering circuit and a first file header, said set of uncompressed image data including color component values for each pixel of an image represented by said set of uncompressed image data, the first file header indicating information about said set of uncompressed image data; and a file compression module coupled to said graphics image generation module for performing a file compression operation on said uncompressed image file, said file compression operation generating a compressed image file representing said uncompressed image file in a compressed form.

* * * * *